(12) United States Patent
Sembely

(10) Patent No.: US 11,434,691 B2
(45) Date of Patent: Sep. 6, 2022

(54) INCLINED AND FIXED BLIND SYSTEM

(71) Applicant: Xavier Sembely, Toulouse (FR)

(72) Inventor: Xavier Sembely, Toulouse (FR)

(73) Assignee: LES INGENIEURS DU SOLEIL, Montespan (FR)

( * ) Notice: Subject to any disclaimer, the term of this patent is extended or adjusted under 35 U.S.C. 154(b) by 552 days.

(21) Appl. No.: 15/746,904

(22) PCT Filed: Jul. 21, 2016

(86) PCT No.: PCT/FR2016/051892
§ 371 (c)(1),
(2) Date: Jan. 23, 2018

(87) PCT Pub. No.: WO2017/017353
PCT Pub. Date: Feb. 2, 2017

(65) Prior Publication Data
US 2019/0040679 A1    Feb. 7, 2019

(30) Foreign Application Priority Data

Jul. 24, 2015  (FR) ........................................ 1501606

(51) Int. Cl.
*E06B 9/386* (2006.01)
*E04F 10/08* (2006.01)
(Continued)

(52) U.S. Cl.
CPC .............. *E06B 9/386* (2013.01); *E04F 10/08* (2013.01); *E06B 7/086* (2013.01); *E06B 9/264* (2013.01);
(Continued)

(58) Field of Classification Search
CPC . E06B 9/386; E06B 9/32; E06B 9/264; E06B 7/086; E06B 2009/2643;
(Continued)

(56) References Cited

U.S. PATENT DOCUMENTS 4,509,825 A * 4/1985 Otto .................. F21S 11/00
160/236
4,742,813 A * 5/1988 Riehl .................. E04F 10/08
126/577
(Continued)

FOREIGN PATENT DOCUMENTS

CN      204282680 U    4/2015
FR      2574469 A1    6/1986

OTHER PUBLICATIONS

English Translation of International Search Report in Int. Appln No. PCT/FR2016/051892, dated Oct. 18, 2016, 2 pages.
(Continued)

*Primary Examiner* — Johnnie A. Shablack
(74) *Attorney, Agent, or Firm* — Servilla Whitney LLC

(57) ABSTRACT

A system of blinds comprising louvers that are inclined in such a way as to maximize the direct solar illumination received during the winter months and to minimize same during the summer months is described. The inclinations are determined according to the terrestrial latitude of the building supporting these blinds, and the orientation of the surface of the building that is to be protected. The longitudinal slope of the louvers is determined such that the longitudinal direction of the louvers is substantially parallel to the straight line of intersection of the plane of the surface and the equatorial plane seen from the building. The transverse tilt of the louvers is determined such that these louvers face in a direction comprised between 12° and 24° below the direction of the equatorial plane.

16 Claims, 11 Drawing Sheets

Figure 1:
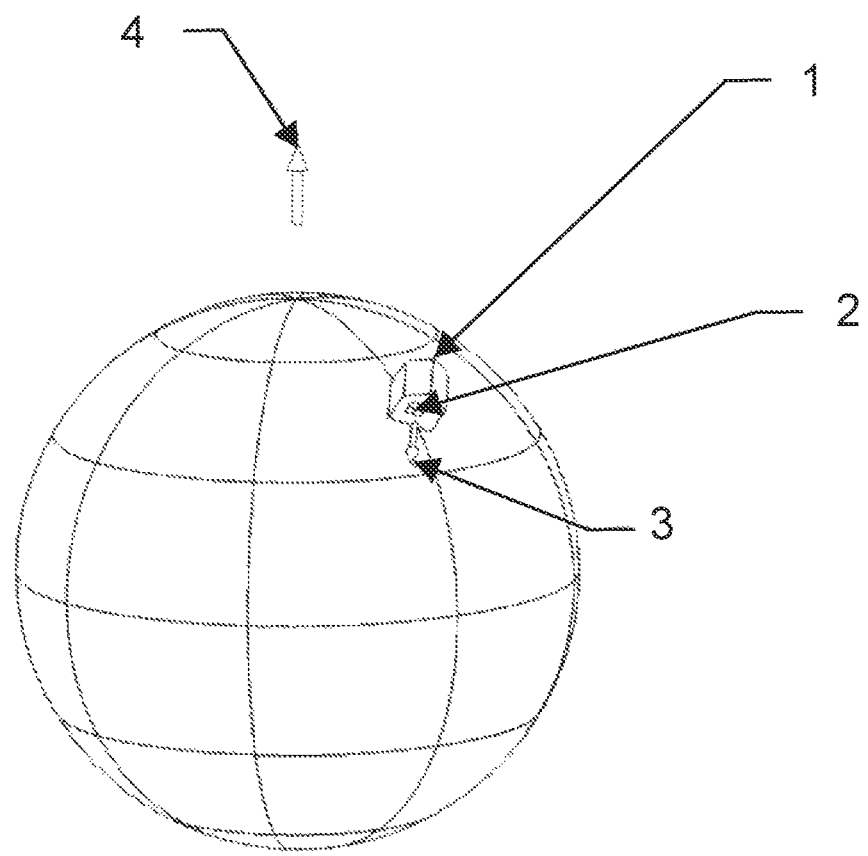

(51) Int. Cl.
*E06B 7/086* (2006.01)
*F24S 50/80* (2018.01)
*E06B 9/32* (2006.01)
*E06B 9/264* (2006.01)
*E06B 9/24* (2006.01)

(52) U.S. Cl.
CPC ............... *E06B 9/32* (2013.01); *F24S 50/80* (2018.05); *E06B 2009/2417* (2013.01); *E06B 2009/2643* (2013.01); *Y02B 10/20* (2013.01); *Y02E 10/40* (2013.01)

(58) Field of Classification Search
CPC ... E06B 2009/2417; F24S 50/80; E04F 10/08; Y02E 10/40; Y02B 10/20
See application file for complete search history.

(56) References Cited

U.S. PATENT DOCUMENTS

| | | | | |
|---|---|---|---|---|
| 4,938,445 A * | 7/1990 | Medley | ............... | E04F 10/08 248/300 |
| 5,285,315 A * | 2/1994 | Stiles | ............... | E06B 9/24 359/592 |
| 6,105,318 A * | 8/2000 | Harrison | ............... | E06B 9/24 52/200 |
| 7,222,461 B2 * | 5/2007 | Piano | ............... | A01G 9/14 52/3 |
| 8,508,169 B2 * | 8/2013 | Zaharchuk | ............... | E05F 15/70 318/468 |
| 8,528,621 B2 * | 9/2013 | Murphy, Jr. | ............... | E04F 10/10 160/5 |
| 8,602,080 B2 * | 12/2013 | Abreu | ............... | E06B 7/082 160/104 |
| 10,767,367 B2 * | 9/2020 | Krass | ............... | E04D 13/0325 |
| 2005/0068630 A1 * | 3/2005 | Nitz | ............... | F24S 50/80 359/613 |
| 2009/0018674 A1 * | 1/2009 | Lagarde | ............... | E06B 9/32 700/16 |
| 2009/0038244 A1 * | 2/2009 | Kuhn | ............... | E06B 9/15 52/203 |
| 2010/0071856 A1 * | 3/2010 | Zaharchuk | ............... | E05F 15/71 160/5 |
| 2014/0196395 A1 * | 7/2014 | Mathez | ............... | E06B 3/6722 52/406.1 |
| 2021/0211086 A1 * | 7/2021 | Schwarze | ............... | E04D 3/40 |
| 2021/0251156 A1 * | 8/2021 | Davico | ............... | A01G 13/0206 |
| 2021/0340771 A1 * | 11/2021 | Santa Claus | ............... | E04F 10/10 |

OTHER PUBLICATIONS

English Translation of Written Opinion of the International Searching Authority in Int. Appln. No. PCT/FR2016/051892, dated Oct. 18, 2016, 4 pages.

* cited by examiner

INCLINED AND FIXED BLIND SYSTEM

CROSS REFERENCE TO RELATED APPLICATIONS

This is a National Phase entry of International Application No. PCT/FR2016/051892, filed Jul. 21, 2016, which claims priority to French Patent Application No. 1501606, filed Jul. 24, 2015, the disclosures of which are incorporated herein by reference in their entireties.

This invention belongs to the field of heating buildings with solar energy.

Solar energy allows a free contribution to the heating of buildings. It therefore makes substantial savings on traditional winter heating modes possible for heating buildings, at temperate latitudes. This leads to an increase in glass surfaces on buildings, especially in sun-exposed directions, i.e., from east to west through the south for temperate regions of the northern hemisphere, so as to allow the passage of a greater amount of free solar flux.

Unfortunately, increasing glass surfaces considerably also leads to a significant increase in solar energy intake in summer, particularly for glass surfaces facing the east and west. The west facing surfaces are a particular problem because the solar flux arrives at an hour when the building has already been heated during the whole day. South-facing surfaces generally enjoy a more favorable situation because of the very high position of the sun around noon in summer, which in fact limits solar inputs.

Similarly, solar energy is advantageously recovered by thermal or thermodynamic solar collector devices, generally installed on the roof of a building, using as a principle the heating of certain parts of these sensors. The adjustment of these sensors is generally complicated by the fact that it must allow proper operation during cold months, while avoiding overheating during the hot months.

Used for quite a long time, blinds have made it possible to respond to the problem of solar flux, by blocking the light rays in a certain direction. However, almost all known blinds have louvers the direction of which are not optimized. In particular the louvers are generally arranged in a horizontal fashion in the direction of their length, and more rarely vertically.

In order for the blinds to be effective in blocking the solar flux during hot months, it is imperative that they be placed outside, so that the solar energy absorbed by the blinds not be rejected as heat to the outside the building.

In order to improve their systems, some blind designers were lead to mechanize these blinds to adjust their orientation, so as to be able to block at will the solar flux or allow it to return upon command. This type of mechanism is described in particular, in European patent EP2245254. These mechanized systems are expensive, especially when they must be placed outside and therefore must withstand bad weather.

In order to improve the energy efficiency of buildings or the regulation of solar collectors at a lower cost, it is useful to develop a system of blinds that will allow the solar flux in during winter and that blocks it in summer. In addition, this will ensure that the solution will be suitable for large South-East and South-West windows and in particular will be very sensitive to the summer solar flux.

U.S. Pat. No. 6,105,318A proposes a solution based on inclined louvers positioned in front of a window. This invention was declined in several variants. The initial idea is that all the louvers of the blinds positioned in front of the variously oriented windows of the same building are all oriented in a common plane. This concept of common plane appears from the first Claim and is the basis of this patent. But this initial idea is not optimal from the point of view of solar protection in the summer and the winter. This is evident in the descriptive text where the author describes how starting from the solution given by generic formulas (indicated in Claims 6 and 16), he is obliged to iterate and deviate from these formulas to find a better summer-winter compromise for example, of a west-facing window at 40° latitude (columns 10, 11 and 12 of the patent text). In addition, this patent is limited to vertical windows; finally, he proposes variants with curved louvers, the interest in which was not demonstrated, and which will not be repeated here. This US patent nevertheless remains the closest Prior Art to the invention proposed below, particularly in terms of motivation and type of solution provided. We will therefore return to this patent later in this text, following the precise description of the invention, and we will show supporting Figures in which this invention proposes a significant advance over this Prior Art.

The invention therefore aims to make a sunshade for residential as well as industrial building surfaces and is particularly suitable for office buildings that are often covered with large glass surfaces.

The same invention can also be applied as a seasonal protective device for thermal or thermodynamic solar collectors installed on a building.

The invention applies to any opening, or any surface (2) of the building (1). It will most often be glazing, but it can be applied to the opening in front of a terrace, a patio or an atrium, this opening being in this case a non-materialized building surface. These openings may therefore optionally be unglazed, but will be considered in the context of this invention as the planar openings. If an opening to the building was not flat, the invention still could apply by breaking the opening into several planar openings. The invention also applies to material surfaces belonging to a building, which one wishes to optimize the exposure to the solar flux depending on the season, such as walls, Trombe walls in particular, or solar collectors, which we wish to avoid overheating during the summer months. The invention applies regardless of the orientation of the surface, fictional or real, of the building, whether vertical (i.e., in the normal horizontal, position, for example, a window in a wall of a house) or not (for example, skylights). Similarly, the fact that the opening or the window (2) is openable or not does not change the applicability of the invention, in the case of a large window casement for example, glazing in the closed position would be considered for the application of the invention.

The invention can also be applied to any ornamental system placed upon a building, such as a wood cladding composed of slatted boards to which one may wish to add a selective thermal function depending on the season for its support surface, most often a wall of the building, or a balcony terrace.

In the following description of this invention, we will therefore speak of 'surface' or 'protected surface of a system of blinds', and possibly 'glazing' even though the discussion only applies to the latter case.

The building (1) considered is positioned at a latitude represented by $\lambda$.

The 3-dimensional vectors are indicated by bold capital letters, in particular B (3) for the normal vector leaving the protected surface of a blind, S for the direction of the sun, unit vector from the sun to the object illuminated, N (4) for the director vector indicating the axis of rotation of the Earth, and facing north.

Two orthonormal coordinates are used in the description of the invention:

A daily Earth coordinate (6), defined as having its Z axis aligned with the direction of the celestial north pole, Y towards the east (at the position of the building), and X which completes the coordinate. At this coordinate, the sun is in the X-Z plane at solar noon.

and the local coordinate system (5), defined as having its Z axis upwards according to the local vertical, Y towards the east, and X which completes the coordinate.

In the local coordinate system (5) thus defined, the vector N(4) has as components $[-\cos(\lambda); 0; \sin(\lambda)]$ Presentation of the Invention:

The main idea is to install a system of blinds in front of the glazing, and to differentiate the orientations of the slats (8) of the blinds according to the $\lambda$ latitude of the building (1) considered and the orientation of the surface (2) considered.

It then becomes possible to propose the simplest type of louvers, that is to say a simple grid of parallel and fixed, non-mechanized louvers, which are very inexpensive. Simply the exact orientation of the louvers (8) will be optimized according to the sun's trajectories as viewed from the surface (2) considered, so as to offer minimal shading in winter, and significant, if not total, shading, in summer.

Rather than simple louvers (8), variants of the invention deconstruct these louvers into elements of a structure developing the louver function in groups. These structures will be called "lamellar structures". Similarly, some variants of the invention described below are not located in front of the glazing, but integrated therewith.

The blinds are geometrically characterized by 4 major characteristics and some minor characteristics. The main characteristics are the tilts of the louvers (8) in the direction of their length, which will be called "longitudinal slope" in the following, "the opening" of the louvers, that is to say the angle of the tilt of the louvers in the direction of their width, which will be called "transverse tilt" in the following, the width of the louvers and their spacing. The last two characteristics can be reduced to a simple ratio of these two sizes. Blinds having the same ratio are differentiated only by a simple homothety, but this does not affect in the first order the shade properties of the blinds.

The minor characteristics may then be the thickness of the louvers (8), the radius of curvature of the louvers which for reasons of rigidity may have a slightly curved section rather than it being simply flat, and the mode of attachment of the louvers together.

This invention relates to the major characteristics and not these minor characteristics, with the exception of the thickness of the louvers for certain variants of the invention. For the implementation of the system of blinds with regard to these minor characteristics, the techniques according to the rules of the art will be used for good performance of the device, in particular in external conditions. Similarly, the technical solution for producing blinds is not specified by this invention. They may be wooden or stainless-steel slats, or even a blind molded from a plastic block, stretched ribbons or any other technique from the state of the art, including blinds integrated into other devices, such as opacified glass in places. The main invention relates to the geometric characteristics allowing optimal operation for these louvers, and how to adjust these characteristics according to the chosen technical solutions.

The determination of the longitudinal slope is as follows:

On conventional blinds, the louvers are generally stacked horizontally, that is to say that the axis along the length of the louvers is horizontal (zero angle).

On a system of blinds according to the invention, each louver or lamellar structure (8) is inclined longitudinally in a direction substantially near a director vector referenced by V (7), and defined as explained below:

If S is the solar direction (unit vector directed from the sun), and B (3) the normal exit from the large window, the flow is maximum when the scalar product S.B is at maximum. We will reference the solar direction corresponding to this maximum as $S_{max}$. In the Earth coordinate (centered in the center of the Earth with Z to the North), S describes in one day a circle around N (4), and B (3) is a fixed vector. $S_{max}$ is therefore in the plane created by the vectors B and N, and this plane is characterized by their vector product V=B^N. This is independent of the elevation of the sun, i.e., of the season, and $S_{max}$ corresponds to a given solar hour, which will be noted $h_{max}$. This hour $h_{max}$ is easily calculated by projecting B on the plane of the equator of the Earth, and by determining what solar time this projection corresponds to by the solar direction (for example, the day of the equinox). It should be noted that we are talking about solar time here, and not local time. The solar time is not corrected for the effects of longitude, changes in time, or shifts due to the eccentricity of the Earth's orbit. According to solar time, noon corresponds exactly to the time when the Sun is in the south direction (for a building located north of the Tropic of Cancer).

By virtue of its mathematical construction, the vector V (7) is a director vector of the line intersection of the plane of the protected surface of a blinds system, and the plane of the equator. The trajectory of the sun near the point of maximum flux is according to the vector V, regardless of the elevation of the sun. Thus, by placing the louvers (8) of the blinds in one direction parallel to V, the geometric calculations of obstruction computed at the moment of $S_{max}$, continue to be valid as long as the sun does not move too far from $S_{max}$, which means during the whole period when the flux entering the glazing is significant, i.e., a few hours around $h_{max}$. Direction V (7) is therefore the optimum direction for the longitudinal slope of the louvers (or lamellar structures) because any adjustment of the blinds made for the time of maximum sunlight will extend several hours before and after this hour of maximum sunshine.

The blinds on south facing surfaces, for which the optimal longitudinal slope corresponds to a horizontal arrangement of the louvers is a special case which is considered as part of the Prior Art.

For illustration, the following table gives the angle of V (7), depending on the latitude $\lambda$ of the building (1) and the orientation of the surface B, in the particular case, but the most common case, of surfaces (2) installed vertically (example: large windows):

| Latitude of the Building | Surface Direction | South | 15° W | 30° W | 45° W | 60° W | 75° W | 90° W | 105° W |
|---|---|---|---|---|---|---|---|---|---|
| 30° | Longitudinal slope | 0° | −24° | −41° | −51° | −56° | −59° | −60° | −59° |
| 40° | | 0° | −17° | −31° | −40° | −46° | −49° | −50° | −49° |
| 45° | | 0° | −15° | −27° | −35° | −41° | −44° | −45° | −44° |
| 50° | | 0° | −12° | −23° | −31° | −36° | −39° | −40° | −39° |
| 60° | | 0° | −8° | −16° | −22° | −27° | −29° | −30° | −29° |

The table only provides values for partially west facing surfaces. The sign convention means that the louvers are oriented at the top left and bottom right when looking at the shutters from inside the building.

For east facing surfaces, opposite values directly apply, i.e., the optimal angle is in the other direction.

For windows or surfaces (2) installed in a non-vertical manner, for example for roof glazing, the generic formula given will simply be applied. The unit vector B (3) is written in in the local coordinate system (5) as [bx; by; bz], the vector V (7) is therefore equal to: [by·sin λ; −bz·cos λ−bx·sin λ; by·cosλ], and the angle of longitudinal slope, is equal to arcsin (by·cos λ/v), where v is the norm of the vector V (as a matter of fact, this one is not generally a unit vector); that is, v is given by: $v=\sqrt{(by^2+bx^2 \cdot \sin^2 \lambda + bz^2 \cdot \cos^2 \lambda + 2 \cdot bx \cdot bz \cdot \sin \lambda \cdot \cos \lambda)}$ In order to limit the number of possible orientations for industrial reasons, a tolerance is proposed on the longitudinal slope of the louvers (8) relative to the optimum direction defined above. If the direction of the louver length is sub-optimal by 15°, a simplified calculation indicates that the projection of the louver degrades the obstruction of the device by about 8% for the winter case, 2 h before or after the hour of maximum sunshine on the surface (2) considered. This degradation increases rapidly when one moves further away from the direction of $S_{max}$. By taking an accuracy of +/−15°, we see that 5 different angles will cover the latitudes of 30° to 60° and all the surface orientations (2) in the case where it is vertical and with an orientation going from east to west and passing to the south.

The same invention also applies to a system of ornamental cladding of the surface of a building consisting of parallel battens, such as siding for a skylight, of which we wish to optimize the geometric properties to bring the solar flux to the surface located underneath in winter, and to protect it in summer. The only difference with the invention presented above is that the thermal function is secondary to the ornamental function depending on the season. Rather than louvers, we will talk about battens, which are long pieces, but not necessarily thin in thickness. The space between the battens will allow direct illumination of the surface below the battens, differentiated according to the season. The sloping angle of these battens must therefore follow the same guidelines as those given for louvers from a system of blinds, that is to say it should be substantially parallel to the direction given by the V vector (7) described above, or in other words, be parallel to the axis defined as the intersection of the surface plane (2) and the plane of the terrestrial equator seen from the building (1).

This type of system will be particularly interesting in the case of walls oriented between 45° and 90° to the east or west, because simple square section battens will allow the winter sun to easily pass between their gaps while rejecting the summer sun. This is because the optimal transverse tilt is close to the surface normal for these orientations, as explained below.

The determination of the longitudinal slope is as follows:

The opening, that is to say the transverse tilt, of the louvers or lamellar structures (8) also makes it possible to optimize the solar flux input.

Since the longitudinal slope has been determined by the vector V (7) in the preceding paragraph, we will consider the plane perpendicular to V to determine the transverse tilt. By turning around the direction V (7), there is in particular an angle where the width of the louver will seek the terrestrial equator plane, which will constitute our reference to determine the angle of the louver around V for a building having the latitude λ and a given orientation surface. The reference direction can be readily determined by calculating the vector product between V (7) and N (4), which will be called E=N^V. Vector E is defined as a director vector from the right aiming at the direction of the equator. This reference has the advantage of very simply describing the invention, as proposed below. This description is unambiguous, i.e., it fully describes the solution. On the other hand, this reference may seem relatively abstract for the manufacturer of the system of blinds. For the implementation, it will therefore be necessary to then recalculate this angle with a more natural reference, for example with reference to the normal surface direction. To do this, one will simply calculate the angle between this vector E and the surface normal B, and one will algebraically add this angle to obtain the angle transverse with respect to the normal of the system of blinds.

The transverse tilt must be defined so as to maximize the incoming flux in winter. It is therefore necessary for the width of the louver to be parallel to the direction of the sun in winter, so that the shadow (19) of the louver will be reduced to a minimum, and will not exceed the thickness of the louver. Over the course of the year the elevation of the sun progresses from between −23.4° and +23.4° with respect to the plane of the equator. In order to minimize the shade between the fall equinox and the spring equinox, it is therefore necessary to tilt the width of the louver in a direction lower than the plane of the equator. The optimum angle to maximize solar flux over the winter period (typically from September 21$^{st}$ to March 21$^{st}$) is approximately 15° below the equatorial direction (as the E vector). This value is calculated by making the simplifying assumption that the solar elevation follows a sine law from one equinox to the other, amplitude −23.4°, and by adding in this half-sine to find the average.

We noticed that if, by convention, we choose to reduce the duration of the winter period around the solstice, we will slightly increase the optimal angle; for example, this optimal angle becomes 19° when we consider the winter period as going from October 21$^{st}$ to February 21$^{st}$.

Nevertheless, we can choose to shift the angle a few degrees downwards so as to increase the difference in illumination between summer and winter, even if it is slightly suboptimal in winter, or optimal over a shorter period.

Similarly, we can choose to shift the angle up a few degrees. This slight degradation of the optimum may be of interest. A case is presented later where it is found that this makes it possible to limit the thickness of the louver (8) in some implementation options.

It is necessary to be relatively accurate when defining the angle of the louver's transverse tilt. Actually, 5° error will induce a drop shadow (19) of 9% of the surface of the louver (8).

Finally, a good operation of the system of blinds will require orienting the width of the louver (8) in an orientation chosen that will be between 12 and 24° below the direction of the equator.

For illustration, the following table gives the transverse tilt, depending upon the latitude λ of the building (1) and the orientation B of the surface (2) considered, in the most common case, on surfaces (2) installed vertically (for example: large windows). To be useful in a practical way, this table uses angle 0 as reference for the normal surface direction:

| Latitude of the building | Surface Orientation | South | 15° W | 30° W | 45° W | 60° W | 75° W | 90° W | 105° W |
|---|---|---|---|---|---|---|---|---|---|
| 30° | Transverse | 42° | 49° | 31° | 20° | 98° | −5° | −18° | −31° |
| 40° | Angle (referred | 32° | 30° | 24° | 15° | 65° | −7° | −18° | −29° |
| 45° | to as 18° under | 27° | 25° | 20° | 12° | 43° | −7° | −18° | −29° |
| 50° | the equatorial | 22° | 20° | 15° | 9° | 41° | −8° | −18° | −28° |
| 60° | plane) | 12° | 11° | 8° | 3° | −4° | 11° | −18° | −25° |

The sign convention is such that a positive sign corresponds to an upward-facing louver when viewed through the system of blinds from inside the building.

The table provides only the values for partially west facing surfaces. They are identical for eastern orientations. In the general case, we will look for an angle of 12° to 24° below the equatorial direction, and we will link the direction of the equator with the system of blinds normal by calculating direction E given above.

The following paragraph describes the performance of the invention in relation to the Prior Art:

At this stage, it is easy to compare the solution provided by this invention, compared to the Prior Art, in particular with respect to the U.S. Pat. No. 6,105,318A patent. This defines an angle called "slope", equivalent to the angle of longitudinal slope as defined above, and a "tilt" angle, equivalent to the angle of the transverse tilt as defined above. Starting from the idea that all planes of the blinds must be parallel to a common plane, the author arrives at a formula given by the equations called "Eq. A" mentioned in column 7, and repeated in Claims 6 and 16. This invention only gives values equal to or close to the full south orientation, for which the angle of the longitudinal "slope" is equal to zero, and the angle of the transverse "tilt" are close, on the order of about twenty degrees for a building located at a latitude of 45°. However, this full south-facing orientation can be considered as part of the Prior Art. As soon as the orientation is different from full south, both inventions provide significantly different solutions. From 15° of orientation to the west for example, solutions differ by about ten degrees in the longitudinal slope, and this difference only increases when the surface deviates from the south. For a west-facing window at 40° of latitude for example, the two inventions differ by 24° in the longitudinal slope, and by 12 to 24° in the transverse tilt. By again taking the example that was given in the patent U.S. Pat. No. 6,105,318A in columns 10, 11 and 12 of the patent, the efficiency provided by this invention is such that in winter more than 95% of the flux entering at 16 h is transmitted to the window (the losses being mainly due to the shadow cast by the thickness of the louvers), instead of 61% as described in the US patent. This mixed efficiency encourages the author to adapt his slope and tilt values, but at the cost of a degradation in the opacity in summer. This adaptation is not necessary with this invention, and the opacity in summer remains total at all times in the afternoon for a west-oriented window at the summer solstice. The author also mentions a second equation set "Eq. B.", which is present in the description, but is not included in the Claims. This second empirical equation set is itself still significantly remote from the optimal solution proposed here (almost 15° difference in the example taken above).

In a variant of the invention, the transverse tilt can alternatively be defined as explained below:

For surfaces (2) receiving very little direct flux in winter anyway, for example northern roof windows, or large windows facing northeast or northwest, it is possible to make a radically different choice concerning the angle of the transverse tilt, that is to say one might choose instead an angle well above the direction of the equator, so as to simply protect themselves from the summer sun.

One variant of the invention therefore consists in orienting the width of the louver (8) significantly above the direction of the equatorial plane. The value of 50° above the direction of the equatorial plane for example allows a separation angle of 26° of separation from the direction of the sun on the day of the summer solstice, which is probably the minimum acceptable for proper operation of the device. Any value that is higher is acceptable. In particular, a strictly normal orientation to the surface protected by a blind may be advantageously selected if the separation condition in the equatorial plane expressed above is satisfied, because it will maximize the indirect illumination provided by the opening while limiting the direct summer flux.

In another variant of the invention, the transverse tilt of the louvers can be adjusted, as explained below:

The winter period is not strictly centered on the solstice. The peak of winter cold arrives several weeks after the winter solstice; the number of weeks depending slightly on the climate of the geographical area of the building. Just as the peak of heat arrives several weeks after the summer solstice.

These shifts present a difficulty for fixed system of blinds, since these systems are linked exclusively to the direction of the sun, and therefore their performance is symmetrical around the summer and winter solstices.

One variant of the invention therefore consists in adding the ability to make adjustments so as to overcome this asymmetry of the climate.

Figure 5:
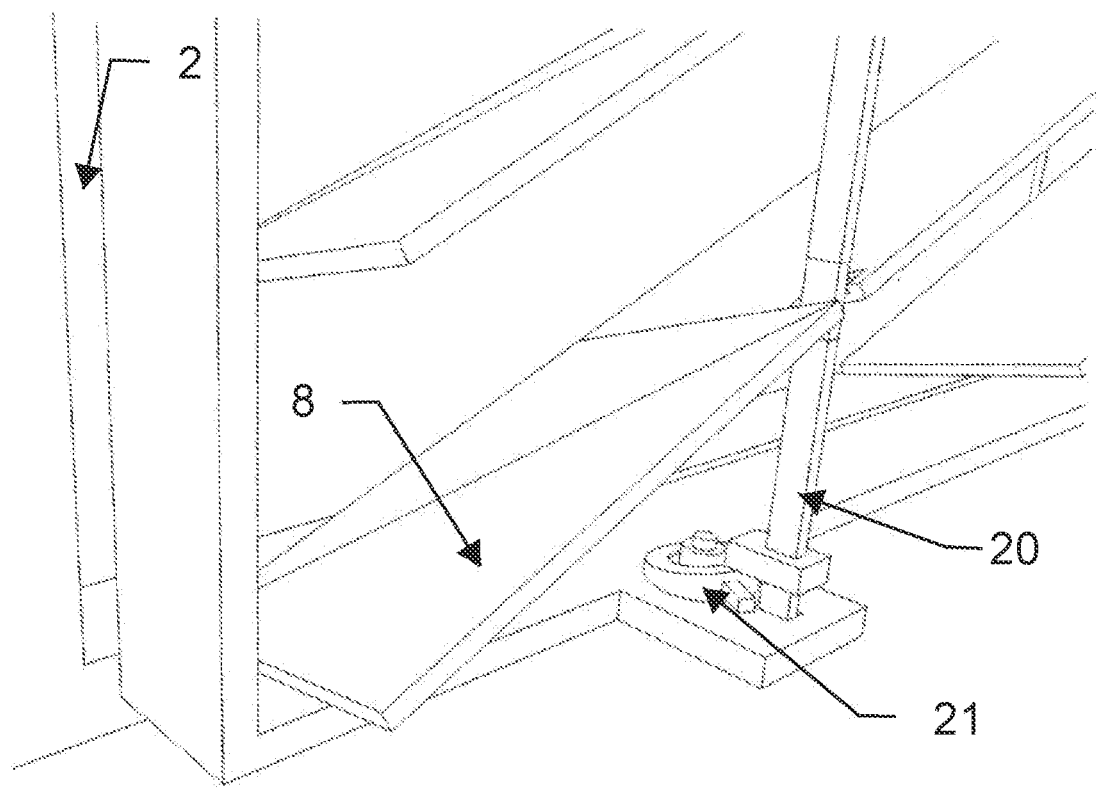

Seasonal adjustment should ideally be done on the transverse tilt of the louvers (8). The ability to make adjustments of a few degrees is sufficient to completely eliminate the lack of asymmetry explained above. We are interested here in the simplest method to make this adjustment possible, which consists of making use of the louvers' (8) flexibility. This method makes it possible to overcome any real mechanism, which is one of the primary motivations of this invention. In applying this method, one may include the use of one or more elongated pieces (20), rods or cables that are laid out straight so as to cross each louver (8) and are attached to each of them. These straight rods or cables (20) make it possible to adjust the transverse tilt by varying the transverse flexibility of the louvers (8), by shimming these elongated pieces. This shimming may be redefined seasonally. In FIG. 5, an implementation of this variant is proposed. In this example the elongated parts (20) are rods fixed by a rotary device (21).

Another way of adjusting the transverse tilt is to implement a rigid system of blinds, and to set up an adjustment for the supporting structure (9) so as to uniformly tilt the louver system so that it is no longer parallel to the surface (2), but slightly inclined with respect thereto. This implementation for an adjustment is capable of modifying both the longitudinal orientation and the transverse orientation, but this method remains very effective, mainly because the good operation of the invention is relatively tolerant to a longitudinal angle which extends somewhat away from the optimum angle described above.

Although this is not one of the primary motivations of the invention, one variant of the invention consists of mechanically adjusting the transverse tilt of the louvers or lamellar structures (8) by means of one or more hinges installed on each lamellar structure. The hinge system itself will be defined according to the Prior Art. It may be motorized or not.

Thanks to these hinges, it is possible to implement the seasonal adjustment of the transverse tilt of the louvers. It is also possible to close the blinds as much as possible by folding them so that the transverse tilt of the louvers is such that they are as parallel as possible to the surface (2).

Although this device does not significantly simplify the implementation of the external blinds compared to the Prior Art, it still has the advantage for the user of giving control of the persistent sunlight during the day. It also allows the seasonal adjustment linked to the shifts in temperature peaks related to the solstice. Finally, it also allows to completely block the surface (2).

The ratio between the pitch between the louvers and the width of the louvers is discussed below:

It is this ratio that will make it possible to optimize the solar protection of the surface in summer. This invention does not freeze this ratio which may be chosen freely by the manufacturer depending on the need for protection in summer. It should be noted that for a system of blinds whose orientation is optimal in terms of winter light (that is to say, the longitudinal slope of the louvers in accordance with the rules defined above, and a transverse tilt of the louvers of about 18° below the direction of the equatorial plane), a step/width ratio equal to 1 makes it possible to reduce the solar flux by 80% on the day of the summer solstice (for a typically South-West or South-East orientation of the Surface (2)). A lower ratio increases this protection and extends it over time during the summer. We also note that the protection generated by the ratio must be recalculated for each louvre system, according to the latitude λ of the building (1), the orientation of the surface (2) considered, and the major geometrical characteristics of the system of blinds, as defined above.

Some lamellar structure design choices are specified below, and constitute a variant of the invention:

When this system is applied to glazing, it may seem harmful for the visual comfort of people inside the building to have the system of blinds obstructing the view from the outside, with the exception of the trajectories of the winter sun. This disadvantage can be largely overcome with the following improvement: Rather than a system of blinds consisting of a simple louver rack, the louver function can be substantially approximated by decomposing it into several distinct elements (10). Rather than 'louvers' we will therefore use henceforth the expression 'lamellar structure'. These different elements will be elongated, that is to say objects that extend in the direction of the length of the lamellar structures and which are held together by one or more fasteners (11) so as to comply with the geometric characteristics described above. These elements will have a non-zero physical thickness—the thickness being defined as the direction orthogonal to the length and width of the lamellar structure, and their distribution in the direction of the width of the lamellar structure will significantly stop the direct rays (15) from the sun during the summer. On the other hand, it will allow the indirect light coming from the direction above the summer sun (14) trajectories to pass through.

The thickness of these elements is essential for properly stopping the direct rays (15) of the sun in the summer trajectory. If we consider that there is approximately 36° difference between an average winter trajectory (13) and an average summer trajectory (14) at the time of maximum illumination $h_{max}$, and if we further consider that the lamellar structure is inclined transversely at 18° below the equatorial direction, then the ratio between the thickness of these elongated elements and their spacing in the direction of the width must be at least:

$$e/d = \sin(36°) = 0.588$$

to be perfectly opaque to the direct summer rays.

If the lamellar structure has been inclined transversely to the lowest recommended angle above, i.e., 12° below the direction of the equatorial plane and if only 40% of the incident solar radiation is tolerated to enter between two elongated elements (10) on the day of the summer solstice, i.e., an opacity of 60%, then the ratio between the thickness of these elongated elements and their spacing in the direction of the width will have to be at least:

$$e/d = 60\% \cdot \sin(23.5°) + 12°) = 0.35$$

to have the desired opacity. This value constitutes the minimum thickness of the elongated elements (10) with respect to the distance between these elements in the direction the lamellar structure's width. In this case, we see that it might be better to be skewed towards the upper transverse tilt of the louvers, in this example at 12° below the direction of the plane of the Earth's equator, that is to say reduce gradually the ability of the system of blinds to allow direct rays to pass through the winter, in order to maintain good protection in the summer while keeping the lamellar structures slender.

This invention offers total freedom when cutting the shape of these elongated elements (10). Specifically, they may be rectangular, flat, or circular. Some forms are particularly interesting. We will focus specifically on a rectilinear cut. It is obvious that the optimal use of this form, that is to say the one that best blocks direct rays (15) of the sun in the summer trajectory, while letting in a maximum of indirect light, consists of an orientation that is perpendicular to this trajectory. We will focus on another use of this same form. In the same way, the materials constituting these elements are not specified. They will be chosen in accordance with the rules of the art.

Another way to improve the invention with respect to the problem raised in the section above is to keep the louvers in a single piece, but to build up its thickness. The rules connecting the width of the holes and the thickness of the louver are identical to those defining the ratio e/d as defined above.

In a variant of the invention, the surface of the panes can be used as a support for the invention, as explained below:

In the particular case of implementing the invention discussed at present, it will be limited to the case where the surface (2) protected by a system of blinds is the glazing. This glazing may be composed of a single pane, or preferably of a double or a triple pane, according to the provisions of the State of the Art.

In this particular case of the invention, it may be particularly advantageous to use one or more of the windows (12) themselves as a support for the system of blinds. The use of elongated elements (10) is particularly suitable for this variant. Indeed, the lamellar structures (8) have their longitudinal direction included in the plane of the glass windows of the glazing. As for the direction of the width it is out of the plane. The separation into elongated elements (10) in the out-of-plane direction therefore makes it possible to use the windows directly as support for the elongated elements, or at least a part thereof.

It should be noted that the louver device is all the more relevant as it is placed outside the glazing as much as possible, since the light absorbed or reflected by the device will be advantageously rejected to the outside of the building during the summer season. Outer panes of a double or triple glazing will therefore be preferable for installation of these elongated elements (10).

In the particular case where the light rays must go through a window to pass from one elongated element to the next within a lamellar structure, the relative position of the successive elongated elements will be corrected from the refraction effects due to the light rays crossing through the window(s) that separate them, to a direction of the sun that corresponds to the winter case, i.e., positioned between 12 and 24° below the direction of the equatorial plane. In this way, the optimal quality of the geometric arrangement described in this invention will be retained.

This use of the windows (12) as a support specifically allows an especially simple implementation of the device, by choosing said elongated elements (10) as a simple opaque film, in an elongated line shape, the length of this line being defined as the direction of the length of the lamellar structures, and the thickness of this line being chosen according to the spacing of the other elongated elements within the same lamellar structure, according to the geometrical recommendations given above. The assembly thus forms a series of lines arranged on the surfaces of one or more window panes (12).

This opaque film can be installed on the glass by gluing, painting or depositing it. The opaque films will advantageously be reflective or white so as to return the solar energy blocked thereby back to the outside.

At most, a lamellar structure (8) will consist of a number of opaque films constituting the elongated elements (10) equal to twice the number of windows (12), i.e., 2 for a single glazing, 4 for a double glazing, and 6 for a triple glazing. However, for the device to be effective in summer, it is preferable for these films to be arranged as much as possible on the outside of the glazing. Therefore, if possible, depositing this on the interior of the windows should be avoided.

In the case of triple glazing for example, one may choose to install these opaque films inside the outer pane and on the central pane. This choice, even if it is less effective than having opaque films on the outer face of the glazing, has the advantage of not interfering with any maintenance operations on the windows and will be less vulnerable to bad weather.

Other elongated elements (10) not made from films can be added to the device to improve its efficiency in summer. These may be outside the glazing, or in inter-window pane areas of multiple glazing, double glazing or triple glazing.

In another close variant of the invention, superimposed transparent films (30) are affixed on a window, each covering the window (12), and opacified surface. The patterns printed on each transparent film are lines positioned according to V (7). The lines on the successive layers will be aligned so that the lines constitute a laminar structure as described above. The width of the printed lines will be directly related to the thickness of the films used as support. According to the description above, the width of the lines should be at least 35% of the thickness of the filter. The minimum number of transparent films for the invention is 1 (assuming that it can be printed on both sides). But this variant is particularly suitable for a significant number of superposed films, for example 5 films. This superposition of transparent films can be advantageously affixed to the outside of the glazing, as much as possible, either on the outer surface directly, or if it interferes with maintenance or for any other reason, on the inner face of the outer pane.

In another variant of the invention, the surface of a window is not used, but the thickness of the window (12) is used as a support for the system of blinds, or some of its components. So, in this way, the opaque areas that constitute or form part of the lamellar structures described above are inserted inside at least one pane (12) of the windows, either by means of a physical element installed during the manufacture of the pane, or by opacification techniques of said glazing.

Specifically, 3D laser engraving technology of glass panes or plexiglass can be used. A particularly effective implementation of the invention is therefore to use the outer pane of a glazing as a support for the laser etching of the louvers arranged within the thickness of the window and whose geometry is defined according to this invention. The pattern engraved in 3D into the thickness of either the glass or the parallel louvers whose orientation will follow the rules set forth in this invention description, or a network of thick lines parallel to the V direction (7) whose alignment reconstitutes the pattern of the lamellar structures as described above and reproduced on all the surfaces of the pane.

The system of blinds presented above in its different variants makes a method of heating a building possible by using direct solar radiation as the main source of heating or as a supplement to heating.

The system of blinds presented above in its different variants makes a method of seasonal protection from a solar collector installed on a building (1) possible. It is particularly suitable for cases where this solar collector is integrated into the sloped roof or wall of the building, for which the orientation of the sensor is not free but imposed by the wall or roof bearing the solar collector.

It may be noted that all of the various variants above are based on the principle of louvers or laminar structures arranged with a longitudinal slope. This principle can in some cases be integrated into the overall aesthetic of the building, or conversely create unsightly oblique lines. One variant makes it easy to overcome this aesthetic problem while adhering to the general principle of the invention. In this variant, it is actually considered that the opening to protect the building should be equipped with large horizontal louvers in the direction of the length, and possibly should be inclined in the width direction, and arranged outside the building. The invention is then applied not to the opening of the building itself, but to each large horizontal louver which becomes the surface (2) to which the invention is applied, according to any one of the variants presented above. The large louver thus becomes highly opaque to the direct rays (15) of the sun in the summer trajectory, and highly transparent to the direct rays (14) of the sun in the summer trajectory. The device is obviously not optimal: this variant is not very effective for openings facing full east or west where the sun is troublesome in summer when its rays are almost perpendicular to the opening. Large louvers offer almost no shade. On the other hand, it can be a very good compromise for openings having a south-east or south-west orientation.

The same variant can be implemented with large vertical rather than horizontal louvers, or with any other orientation of large louvers, according to the other interests—technical or aesthetic—held by the architect of the building.

In another variant of the invention, dedicated to a particularly lean and cost-effective implementation, the system of blinds is implemented in a pattern of elongated hexagonal cells, so as to remove the bulk of the supporting structures (9) and/or (10), and that the louvers are both easy to assemble and self-supporting. In this variant, each louver (8) consists of at least one sheet and is divided into regular sections in the general longitudinal direction, so that, over long sections, the at least one sheet is placed precisely according to the longitudinal direction, and on the short sections (41), the at least one sheet rejoins the next long section in a direction oblique to the longitudinal direction. The long sections may advantageously consist of two sheets glued together. With this louver system arranged in the elongated cells, the only need for a supporting structure (10) is a need for a fastening system for the honeycomb system.

In another variant of the invention, each louver (8) consists of a transparent material of which at least one surface is partially covered with opaque films in regular patterns making it possible to adjust the overall opacity of the louver (8). The opaque film may be printed, painted or deposited on the transparent material. This variant has the advantage of being a lean and cost-effective implementation, for example with a louver made of a flat transparent sheet, and the opacity adjustment makes it possible to have louvers that are not perfectly opaque, which would be the cause for visual discomfort in the case of a system of blinds installed in front of a window. In addition, the regular opaque patterns reproduced on the 2 main surfaces, for example a succession of lines and line spacings, making it possible to obtain variability in the opacity of the louver according to the direction of the sun. In this lean and cost-effective variant, it can be interesting to design the supporting structure with thick transparent sheets, crossing the louvers and joined together by simple notches on both sides, possibly attached by glue points.

In another variant of the invention, each louver (8) consists of a sheet formed in such a way that the plane that traverses perpendicularly to the longitudinal direction is made up of a succession of at least one zone(s) whose slope is less than the average slope corresponding to the transverse tilt (35) and which is substantially perpendicular to the direction of the solar rays for the summer trajectories of the sun (14), and of at least one zone(s) in which the slope is greater than the average slope corresponding to the transverse tilt (36). These successive zones are not necessarily symmetrical. This device makes it possible at the same time to give rigidity to the thin sheet constituting the louver, and to offer very good opacity in the zone(s) (35) that are substantially perpendicular to the solar rays for the summer trajectories (14), while providing some transparency—useful for visual comfort—in other directions. This transparency is achieved by either using a sheet of non-opaque material or by making holes in the surface of the sheet.

The description of the drawings is proposed below:

FIG. 1 defines both the conditions of the problem posed, and presents the main geometric elements that make it possible to solve it according to the invention. The sphere in the drawing represents the terrestrial globe. The axis of Earth's rotation is characterized by the vector N (4), unit vector oriented towards the North, which is by definition perpendicular to the equatorial plane. The building (1) is positioned on the globe at a latitude λ defined as the angle going from the equatorial plane to the line parallel to the building (1). In this building, there is a surface (2) that is to be equipped with a system of blinds. This surface—for example a simple window—is characterized by its vector B (3), which is its normal unit vector to the surface (2) and outgoing. The solution to the problem posed proposed in this invention is to optimize the system as a function of the vector N (4) seen from the building, and the vector B (3) characterizing the surface.

Figure 2:
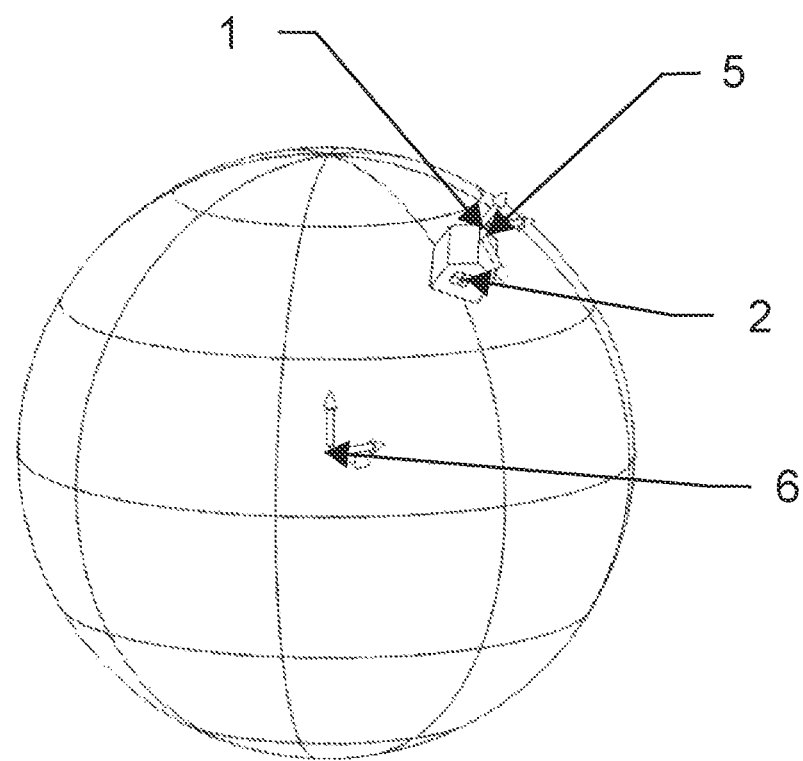

FIG. 2 completes FIG. 1 by showing the local coordinate (5) and the Earth coordinate (6). The X and Y axes of the Earth coordinate constitutes the equatorial plane used several times in the description and in the Claims of the invention.

Figure 3:
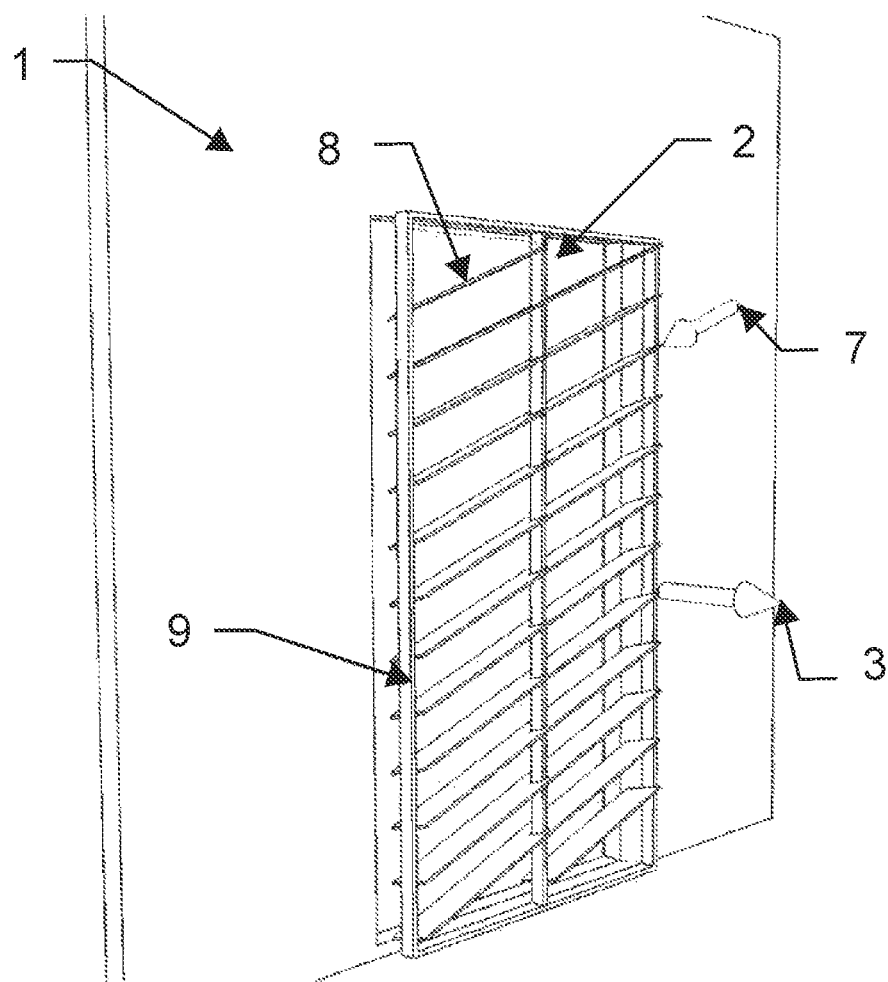

FIG. 3 shows the simplest version of the invention consisting of a single grid of parallel louvers (8). A wall of the building (1) is shown. Part of this wall consists of a surface (2) that is to be protected by a system of blinds. Also shown in this drawing are the vector B (3) characterizing the surface (2), and the vector V (7)—the result of the vector product of B (3) and N (4)—which carries the direction of the intersection between the surface (2) and the equatorial plane. The system of blinds consists of a number of louvers (8) parallel to each other and inclined in the direction of their length along the vector V (7). The louvers are maintained according to the desired geometry thanks to a supporting structure (9) consisting of a number of supporting structures, 3 vertical and 2 horizontal in the example illustrated by this Figure. In this embodiment, the louvers (8) are fixed rigidly to the supporting structure (9).

Figure 4:
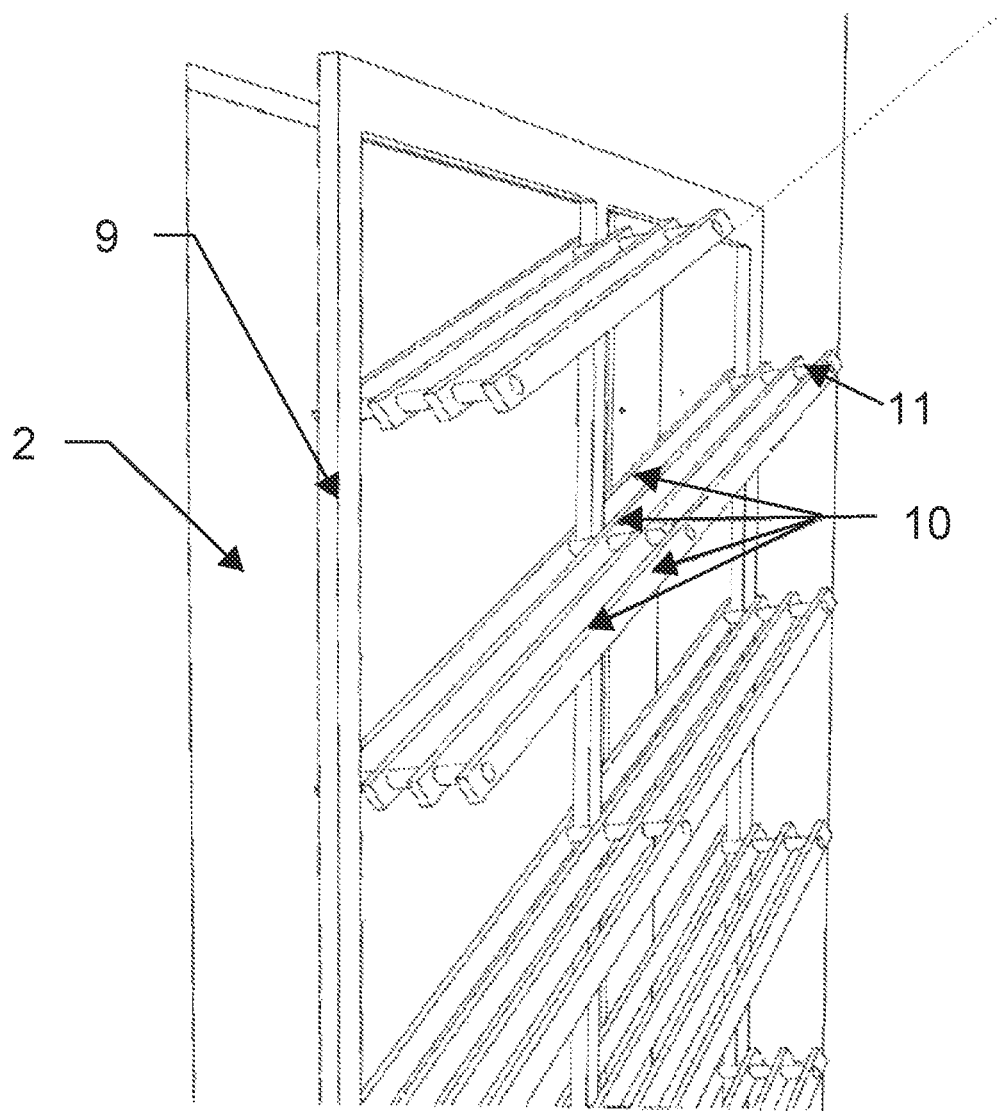

FIG. 4 shows a variant of the invention in which the louvers (8) are replaced by the lamellar structures composed of an alignment of elongated elements (10), held together and aligned according to the geometric constraints exhibited in this invention by structure elements (11). Some elements of the previous Figure are reproduced in this drawing, such as the surface (2) or the supporting structure of the system of blinds (9).

FIG. 5 shows a variant of the invention as shown in FIG. 3. In this variant, elongated pieces (20) allow adjustment of the opening of the louvers (8), by varying the flexibility of the latter. In order to make these seasonal adjustments, a shimming piece (21) is arranged at the end of each elongated piece so as to adjust the height of the elongate pieces (20), which bend the louvers (8) themselves.

Figure 6:
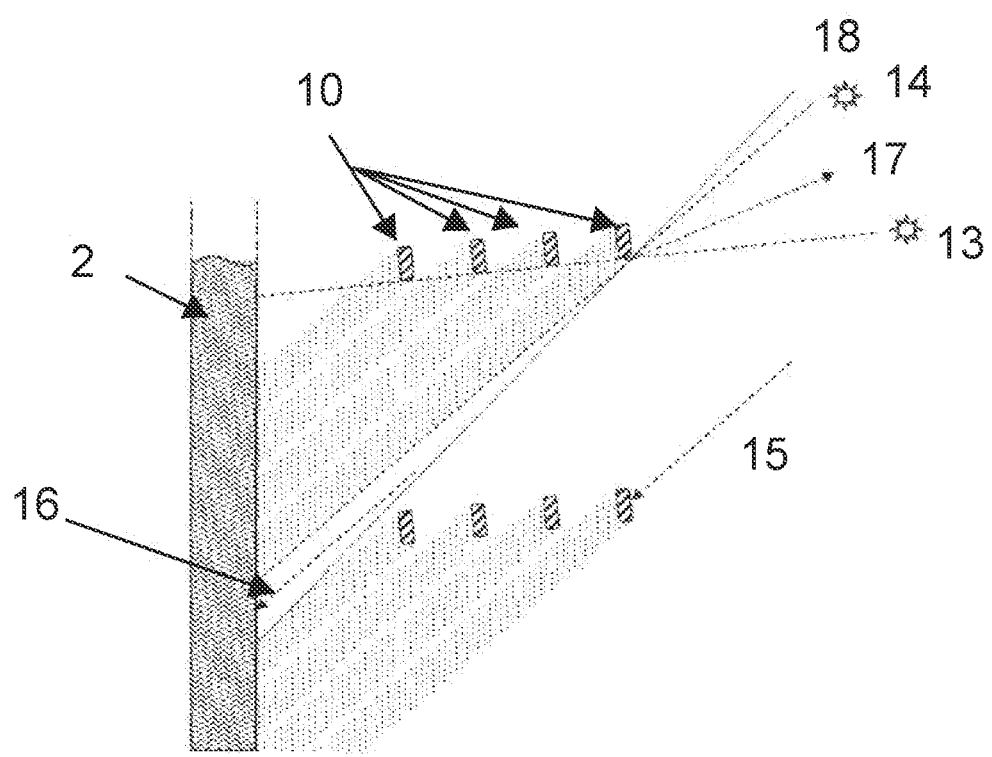
Figure 7:
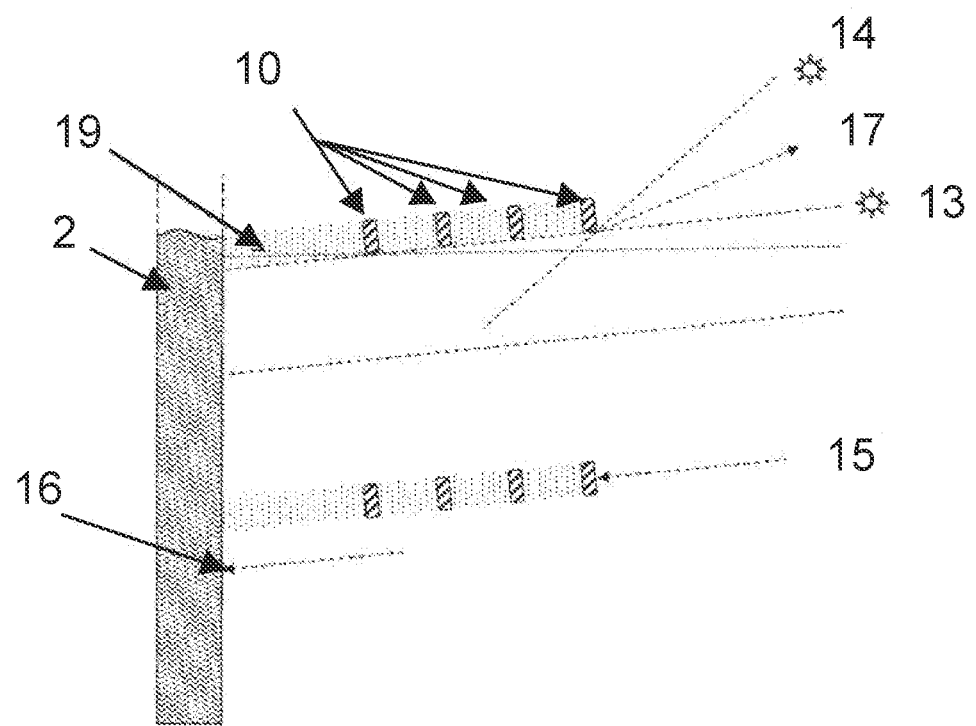

FIGS. 6 and 7 show the geometric principle of operation of the system of blinds illustrated in FIG. 4. FIG. 6 presents the summer case, while FIG. 7 presents the winter case. The two Figures represent sections of the system shown in FIG. 4, the cut plane being perpendicular to the direction shown by the vector V (7). Some elements of FIG. 4 are shown in FIGS. 6 and 7: a cut view of the elongated elements (10), and the surface (2). The other elements concern the geometry of solar radiation. The direction of the equatorial plane (17) seen from the cut plane is indicated on both drawings. The mean direction of the sun during the winter period is shown (13), typically 18° below the direction of the equatorial plane (17). The mean direction of the sun during the summer period is shown (14), typically 18° above the direction of the equatorial plane (17). In the FIG. 6), the extreme direction of the sun on the day of the summer solstice (18) is indicated, a little more than 23° above the direction of the equatorial plane (17). Shading in the direct sunlight for the average summer direction is indicated. The solar rays stopped by the system of blinds (15) constitute more than ⅔ of the summer solar radiation in this arrangement, while the solar rays (16) actually reaching the surface (2) constitute less than one third of the direct solar radiation.

In the FIG. 7, the extreme direction of the sun on the day of the winter solstice (19) is indicated, a little more than 23° above the direction of the equatorial plane (17). Shading in the direct sunlight for the average winter direction is indicated. The solar rays stopped by the system of blinds (15) are in this case less than 15% of the winter solar radiation in this arrangement, while the solar rays (16) actually reaching the surface (2) are more than 85% of the direct radiation, for the exemplary embodiment illustrated in this Figure. It can be seen from this drawing that the orientation along the width of the lamellar structure (8), and therefore of these different successor elements (10), has been designed so that it is parallel to the mean direction (13) of the sun during the winter period.

Figure 8:
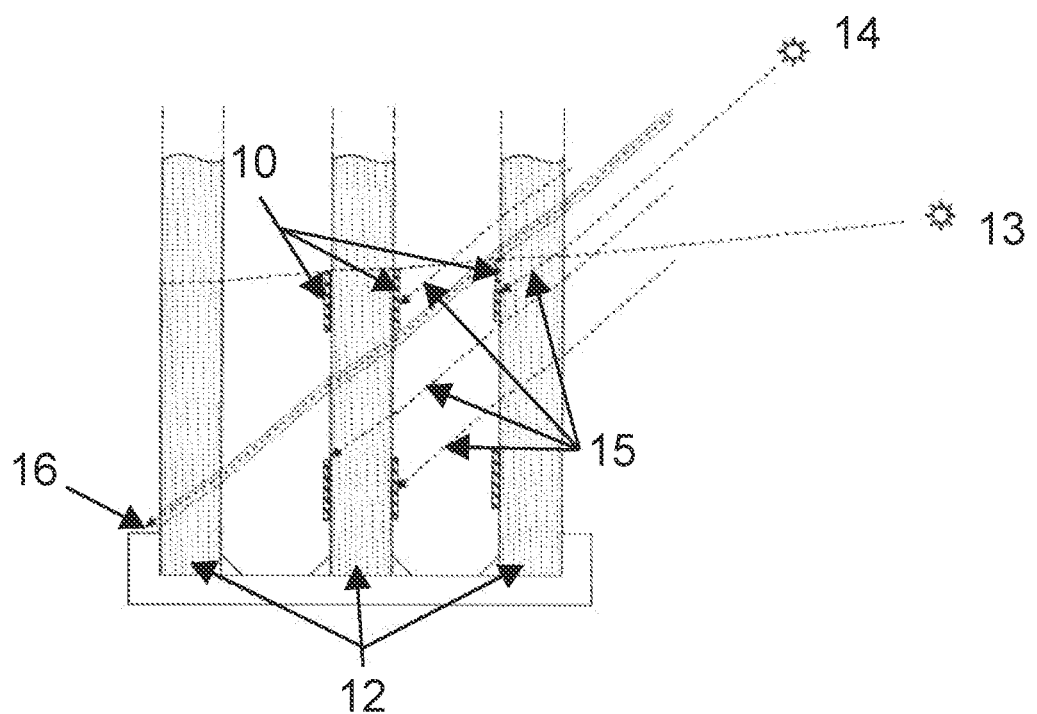

In FIG. 8 a variant of the invention is presented using the windows (12) constituting the glazing, more generally called the surface (2) in this presentation, as a support for the elongated elements (10). Here again the cut plane is perpendicular to the direction of the vector V (7). The mean direction of the sun during the winter period (13) and the mean direction of the sun during the summer period (14) are shown. The elongated elements (10) consist of a film deposited on certain surfaces of certain panes (12). The alignment of the various elongated elements in the direction of the crossing of the glazing is optimized by following the sun's rays for a mean direction of the sun during the winter period (13), taking care to take into account the effects of refraction when crossing the windows. For a mean direction of the sun during the summer period (14), a large majority of the sun's rays (15) are stopped, and a small minority of the sun's rays (16) finally cross the entire glazing.

Figure 9:
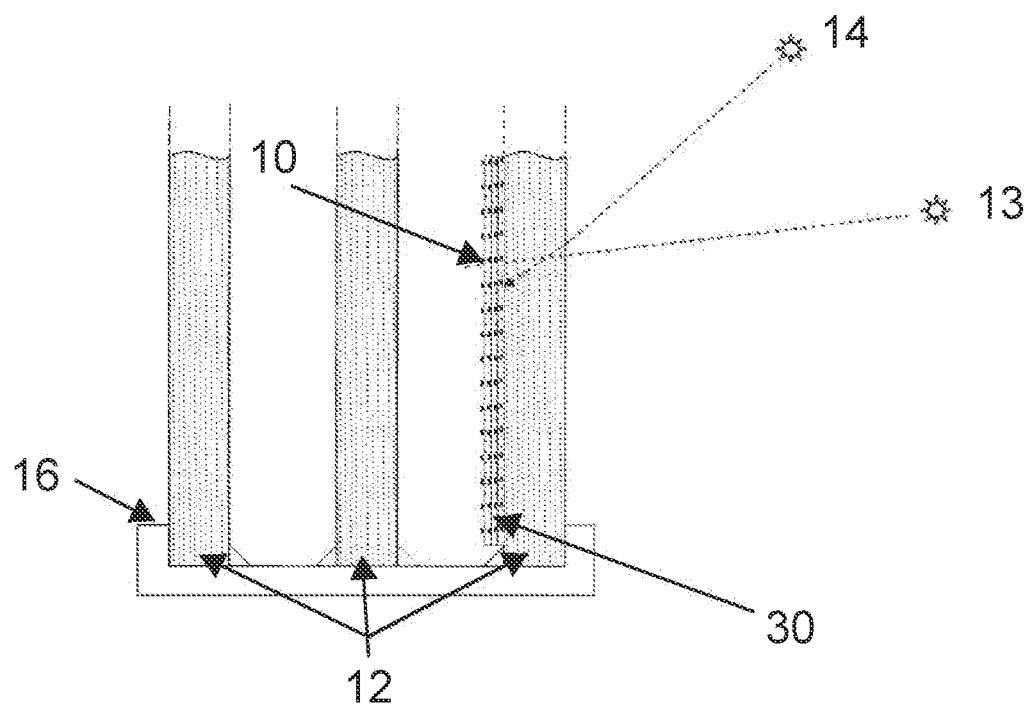

In FIG. 9 a variant of the invention is presented using transparent films (30) superimposed and affixed to a window (12) constituting the glazing, as a support for the elongated elements (10). Here again the cut plane is perpendicular to the direction of the vector V (7). The mean direction of the sun during the winter period (13) and the mean direction of the sun during the summer period (14) are shown. The elongated elements (10) consist of a single opaque print on the surface of the transparent film (30). The alignment of the various elongated elements in the direction of the crossing of the glazing is optimized by following the sun's rays for a mean direction of the sun during the winter period (13), taking care to take into account the effects of refraction when crossing the transparent films. The operation in summer and winter is quite similar to that shown in FIGS. 6 and 7, but in miniature, the spacing between the different elongated elements (10) being defined by the thickness of the transparent films (30).

Figure 10:
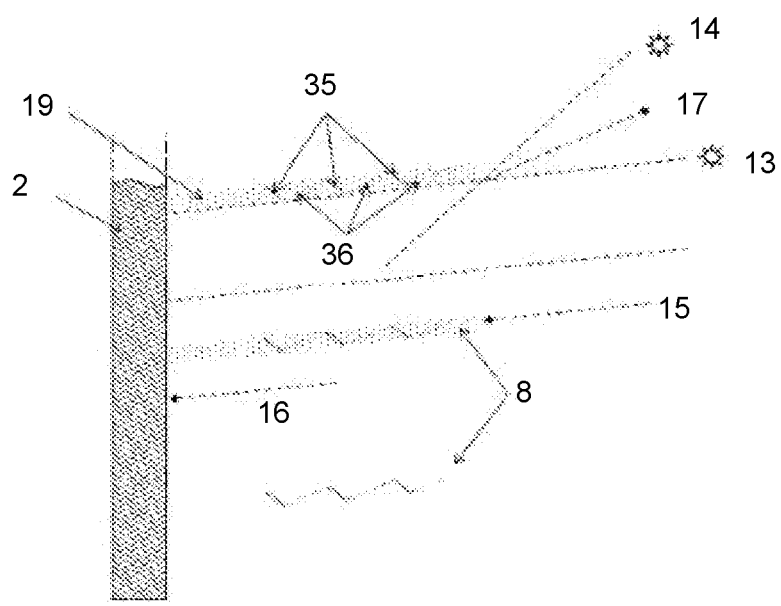

In FIG. 10 the variant of the invention presented consists of a thin sheet formed in such a way that the its cut plane that traverses perpendicularly to the longitudinal direction is made up of a succession of at least one zone(s) whose slope is less than the average slope corresponding to the transverse tilt (35) and which is substantially perpendicular to the direction of the solar rays for the summer trajectories of the sun (14), and of at least one zone(s) in which the slope is greater than the average slope corresponding to the transverse tilt (36). The mean direction of the sun during the winter period (13) and the mean direction of the sun during the summer period (14) are shown. The solar rays stopped by the system of blinds (15) and the solar rays (16) actually reaching the surface (2) are also shown in this figure.

Figure 11:
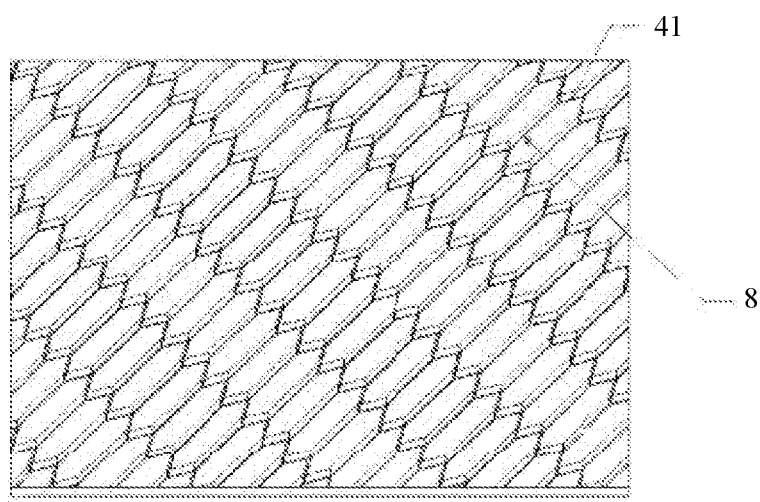

In FIG. 11 the variant is presented and implemented in a pattern of elongated hexagonal cells. Each louver (8) consists of at least one thin sheet and is divided into regular sections in the general direction of the longitudinal direction, so that over long sections, the sheet is placed precisely in the longitudinal direction, and on short sections (41), the sheet rejoins the next long section in a direction oblique to the longitudinal direction.

One of the embodiments of the invention is presented in detail below and is illustrated in FIG. 8:

Take the example of a system of blinds integrated into the glazing to protect large windows of 2.5 m by 2 m. At the time the large window is manufactured, the orientation once the large window is installed and the latitude of the destination building are known, for example an orientation of 60° west for a building built on the 45$^{th}$ parallel ($\lambda$=45°).

If the large window is triple-glazed consisting of 3 panes each of 4 mm and spaced 12 mm, proceed as follows:

On the inner surface of the outer pane and on both sides of the central pane, reflective films (10) are affixed. These films are in the form of thin metal strips 6 mm wide inclined by 38° with regard to the horizontal and spaced every 20 mm. The strips are positioned in a substantially identical manner on the 3 surfaces on which they are installed, including their shimming, relative to the vertical, since for this orientation and this latitude, the transverse tilt is close to 0°.

This implementation brings in 70% of direct radiation in winter, and allows only 30% of it in summer.

The invention claimed is:

1. A sunshade device for a flat surface of a building comprising a series of generally parallel louvers or lamellar structures configured to cover all or a portion of the flat surface, wherein when the sunshade device is installed to cover all or the portion of the flat surface, each louver or lamellar structure has a longitudinal tilt which is parallel to an axis defined by a vector product V=B^N, where B is a vector normal to the flat surface and N is a vector indicating the axis of rotation of the Earth, where N is oriented towards the North and V is independent of seasonal elevation of the sun.

2. The sunshade device of claim 1, wherein when the sunshade device is installed to cover all or the portion of the flat surface, the louvers or lamellar structures are inclined transversely at an angle defined according to a terrestrial latitude of a location of the building and an orientation of the flat surface, and the angle is higher than 50° above a direction of the Earth's equatorial plane, the rotation counted around a longitudinal direction of the louvers or lamellar structures.

3. The sunshade device of claim 1, wherein one or more hinges allow custom adjustment of the transverse tilt of the louvers or lamellar structures.

4. The sunshade device of claim 1 applied to a glass pane, wherein opaque zones constituting or forming part of the lamellar structures are inserted inside at least one pane of glass of the glazing, either by a physical element installed during the manufacture of the glazing material, or by opacification techniques of points positioned in 3D inside said glazing, and according to a geometry corrected for refractive effects due to the orientation of the width of the louvers.

5. The sunshade device of claim 1, wherein the sunshade device is applied to a second flat surface of the building with horizontal louvers in a direction of a length of an opening of the building to be protected.

6. The sunshade device of claim 1, wherein the sunshade device constitutes a cladding on a skylight for a building surface.

7. The sunshade device of claim 1, wherein each louver comprises at least one sheet and is divided into regular sections in the general longitudinal direction, so that, over one or more long sections, the at least one sheet is placed precisely according to the longitudinal direction, and on one or more short sections, the at least one sheet rejoins the next long section in a direction oblique to the longitudinal direction.

8. The sunshade device of claim 1, wherein each louver is made of a transparent material of which at least one surface is partially covered with opaque films in regular patterns.

9. The sunshade device of claim 1, wherein the sunshade device optimizes solar input through the flat surface regardless of the season.

10. The sunshade device of claim 1, wherein when the sunshade device is installed to cover all or the portion of the flat surface, the louvers or lamellar structures are inclined transversely at an angle defined according to a terrestrial latitude of a location of a building and an orientation of the flat surface, wherein the angle is between 12° and 24° below a direction of the Earth's equatorial plane, the rotation counted around a longitudinal direction of the louvers or lamellar structures.

11. The sunshade device of claim 10, wherein the louvers or lamellar structures are held together by a supporting structure, wherein an elongated piece intersects each louver or lamellar structure and is attached together to adjust the transverse tilt of the louvers or lamellar structures by shimming of the elongated piece.

12. The sunshade device of claim 10, wherein each louver comprises a sheet having a cut plane that traverses perpendicularly to the longitudinal direction comprising a succession of at least one zone(s) whose slope is less than the average slope corresponding to the transverse tilt and is substantially perpendicular to the direction of the solar rays for the summer trajectories of the sun, and of at least one zone(s) in which the slope is greater than the average slope corresponding to the transverse tilt.

13. The sunshade device of claim 10, wherein the lamellar structures comprise 2 or more separate elongated elements held together aligned in the width direction, and having a thickness at least equal to 0.35 times the distance separating 2 consecutive elongated elements.

14. The sunshade device of claim 13 applied to a glass pane, wherein one or more of the elongated elements are attached to one or more panes of a glazing unit and in that the transverse tilt of the lamellar structures is corrected for the refraction effects due to the crossing of the sun's light rays through a window or windows separating the elongated elements of the same lamellar structure, for a direction of the sun corresponding to the winter case, i.e., positioned between 12 and 24° below the direction of the Earth's equatorial plane.

15. The sunshade device of claim 14, wherein at least one of these elements comprise an opaque film affixed to the surface of the glass pane.

16. The sunshade device of claim 14, wherein the elongated elements are printed lines either on the surfaces of a transparent film affixed to the surface of the glass pane, or on the surfaces of several superposed transparent films affixed to the surface of the window.

* * * * *